C. Konold,
Making Tools.
No. 104,165. Patented June 14, 1870.

Witnesses
Josiah W. Ells
J. B. Whaley

Inventor
Christian Konold

United States Patent Office.

CHRISTIAN KONOLD, OF PITTSBURG, PENNSYLVANIA.

Letters Patent No. 104,165, dated June 14, 1870.

IMPROVEMENT IN DIES FOR FORGING VISE-BOXES.

The Schedule referred to in these Letters Patent and making part of the same

I, CHRISTIAN KONOLD, of Pittsburg, in the county of Allegheny and State of Pennsylvania, have invented certain Improvements in Dies for Forging and Swaging Vise-Boxes, of which the following is a specification.

Nature and Objects of the Invention.

The upper and lower dies are constructed each with a series of semicircular grooves and depressions shaped so as to give form to that part of the vise-box corresponding therewith, the object being to forge them faster, smoother, better, and more uniform in shape and size than can be accomplished in the ordinary way.

Description of the Accompanying Drawing.

Figure 3:
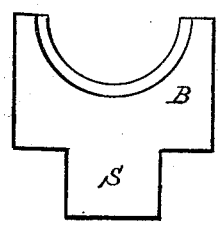

Figure 3, end view of one of the dies.

Figure 4:
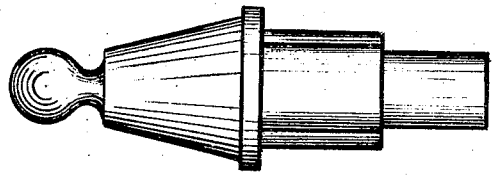

Figure 4 represents a pipe or vise-box.

General Description.

Figure 1:
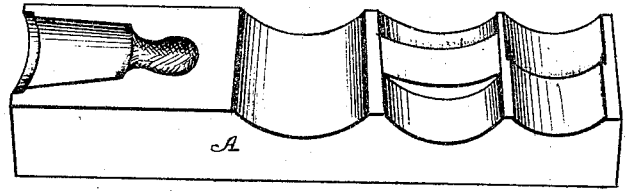
Figure 1 represents a perspective view of one of the dies, showing the grooves and depressions in its face.
Figure 2:
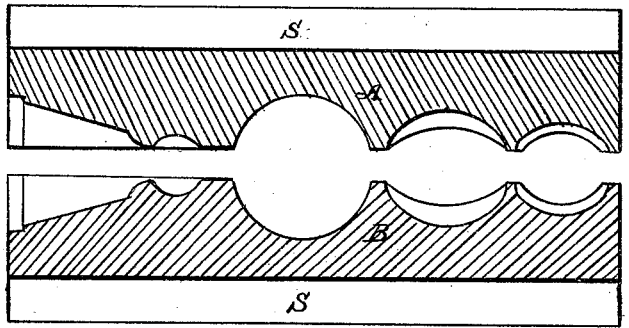
Figure 2 is a longitudinal vertical section of top and bottom dies.

These dies are to be made of steel, cast iron, or other hard metal, the upper die A being an exact counterpart of the lower one, B, each provided with a longitudinal tongue, S, to secure them, the one in an anvil, and the other in the face of a drop or hammer, and so arranged that when in operation the various grooves in each will correspond, and will work on a line, as shown in fig. 2. These grooves and depressions are intended to produce on a piece of hot iron, placed between them, the several diameters, shoulders, and shapes usually given to the exterior of a pipe or vise-box, fully represented by fig. 4, which vise-box, when finished, consists of a short strong metallic tube, having a screw cut therein corresponding in shape and size to a male screw operating therewith, for opening and closing the vise.

To make a vise-box, I take a short thick piece of flat bar iron, and bring its edges together in such a manner as to form a stout tube, a little less in length than the intended box. This tube is then brought to a welding heat, placed on a mandrel, and submitted to the action of a pair of dies, constructed as shown and described, which operation welds the tube, and gives it the requisite shape and length, by varying its external diameter, making that part intended to pass through the "vise-stock" not only less in size, but of an elliptical shape, which shape answers the purpose of a feather, and prevents its rotation when placed in the vise. The mandrel is then withdrawn, and a screw cut through the entire tube, after which the knob or cascabel is added to stop the tube at the large end, and give finish to the box.

Claim.

I claim the series of dies having the various grooves and depressions, therein shown and described, for the purpose of forging and swaging vise-boxes, substantially as set forth.

CHRISTIAN KONOLD.

Witnesses:
JOSIAH W. ELLS,
J. B. WHALEY.